US012761830B2

(12) United States Patent
Shetty et al.

(10) Patent No.: US 12,761,830 B2
(45) Date of Patent: Oct. 13, 2026

(54) WRITE PADDING DATA TO MEMORY DEVICE USING ON-DEVICE COPY

(71) Applicant: Micron Technology, Inc., Boise, ID (US)

(72) Inventors: Abhishek Shetty, Bengaluru (IN); Pradeep Sreedhar, Bengaluru (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/020,753

(22) Filed: Jan. 14, 2025

(65) Prior Publication Data

US 2025/0238161 A1 Jul. 24, 2025

Related U.S. Application Data

(60) Provisional application No. 63/623,022, filed on Jan. 19, 2024.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

2008/0229000 A1* 9/2008 Kim .................... G11C 16/10 714/48
2013/0024618 A1* 1/2013 Doron .................... G06F 13/00 711/E12.019
2023/0140773 A1* 5/2023 Raju .................... G06F 3/064 711/154
2023/0409212 A1* 12/2023 Avraham .............. G06F 3/0644
2024/0272794 A1* 8/2024 Moshe .................. G06F 3/0656
2024/0354003 A1* 10/2024 Bhardwaj .............. G06N 3/063
2025/0044979 A1* 2/2025 Li ........................... G06F 3/067

* cited by examiner

*Primary Examiner* — Nicholas J Simonetti
(74) *Attorney, Agent, or Firm* — Schwegman Lundberg & Woessner, P.A.

(57) ABSTRACT

Various embodiments provide for writing padding data to a memory device, such as a NOT-AND-type memory device, using an on-memory-device copy operation, which can be used as part of a memory system. According to some embodiments, writing padding data to one or more target blocks of a memory device comprises performing an on-memory-device copy operation to copy padding data (e.g., one or more pages of padding data) from a padding source (e.g., dedicated padding source block) on the memory device to the one or more target blocks (e.g., to one or more target pages of the one or more target blocks).

20 Claims, 5 Drawing Sheets

WRITE PADDING DATA TO MEMORY DEVICE USING ON-DEVICE COPY

PRIORITY APPLICATION

This application claims the benefit of priority to U.S. Provisional Application Ser. No. 63/623,022, filed Jan. 19, 2024, which is incorporated herein by reference in its entirety.

TECHNICAL FIELD

Example embodiments of the disclosure relate generally to memory devices and, more specifically, to writing padding data to a memory device (e.g., NOT-AND (NAND)-type memory device) using an on-memory-device (e.g., on-NAND-chip) copy operation, which can be used as part of a memory system (e.g., memory sub-system).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
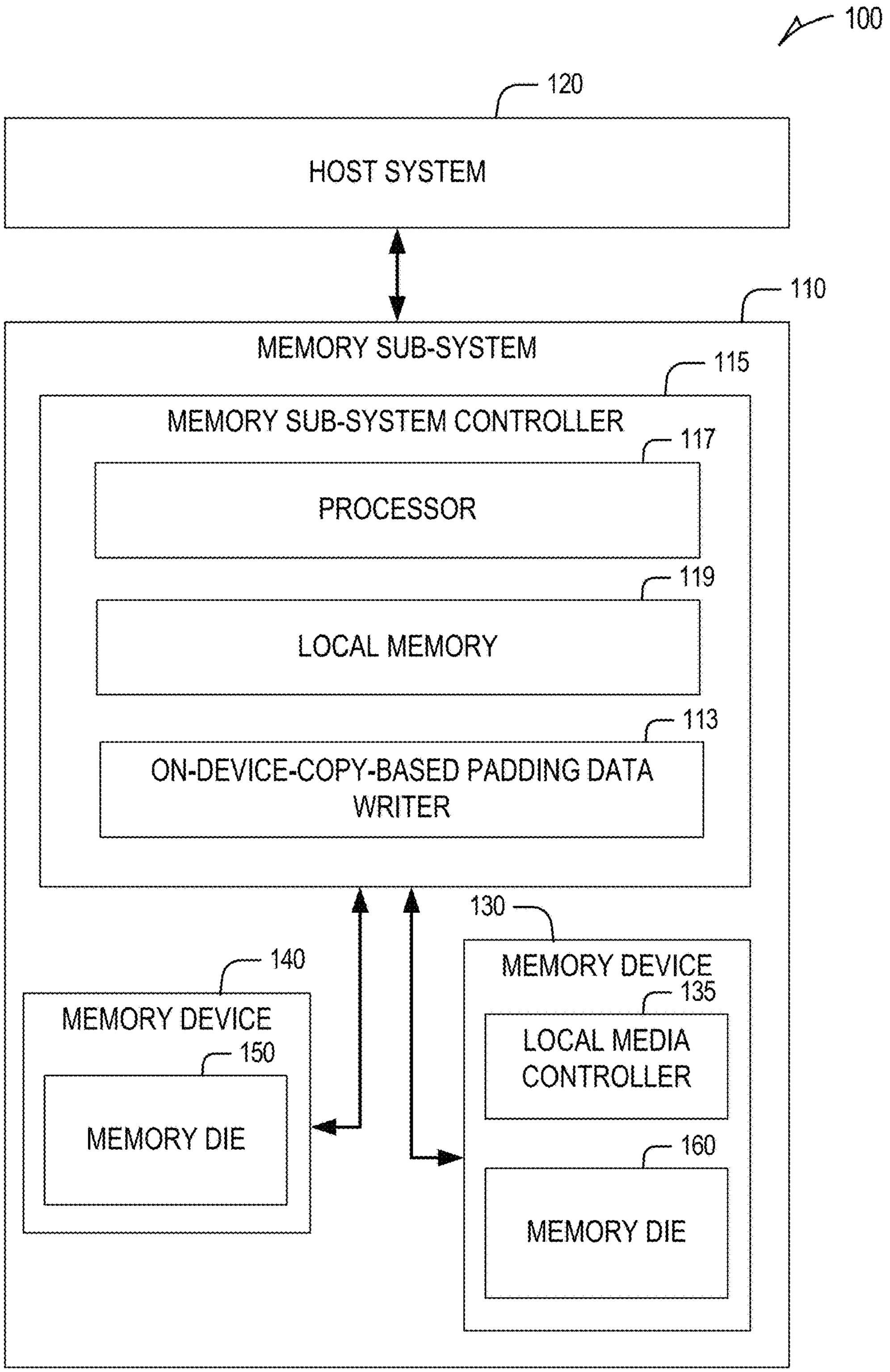
FIG. 1 is a block diagram illustrating an example computing system that includes a memory sub-system, in accordance with some embodiments of the present disclosure.

Aspects of the present disclosure are directed to writing padding data to a memory device (e.g., NOT-AND (NAND)-type memory device) using an on-memory-device (e.g., on-NAND-chip) copy operation, which can be used as part of a memory system (e.g., memory sub-system). A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs with respect to a memory device on the memory sub-system. The data to be read or written, as specified by a host request (e.g., data access request or command request), is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation on host data that is stored on a memory device or a scan (e.g., media scan) of one or more blocks of a memory device. For example, firmware of the memory sub-system can re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as an L2P table), data from logging, scratch pad data, and so forth).

A memory device can be a non-volatile memory device. A non-volatile memory device is a package of one or more die. Each die (e.g., NAND-type memory device die) can comprise one or more physical planes (or planes). Groupings of planes can be organized according to logic units (LUNs), with each individual logic unit (LUN) being associated with a different grouping of planes. For some types of non-volatile memory devices (e.g., NOT-AND (NAND)-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Generally, writing data to such memory devices involves programming (by way of a program operation) the memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together)

defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, a block (a quad-level cell (QLC) block) can comprise QLCs, and a block (a penta-level cell (PLC) block) can comprise PLCs. Other blocks comprising other types of memory cells (e.g., higher-level memory cells, having higher bit storage-per-cell) are also possible.

Each worldline (of a block) can define one or more pages depending on the type of memory cells (of the block) connected to the wordline. For example, for an SLC block, a single wordline can define a single page. For a MLC block, a single wordline can define two pages—a lower page (LP) and an upper page (UP). For a TLC block, a single wordline can define three pages—a lower page (LP), an upper page (UP), and an extra page (XP). For a QLC block, a single wordline can define four pages—a lower page (LP), an upper page (UP), an extra page (XP), and a top page (TP) page. As used herein, a page of LP page type can be referred to as a "LP page," a page of UP page type can be referred to as a "UP page," a page of XP page type can be referred to as a "XP page," and a page of TP page type can be referred to as a "TP page." Each page type can represent a different level of a cell (e.g., QLC can have a first level for LPs, a second level for UPs, a third level for XPs, and a fourth level for TPs). To write data to a given page, the given page is programmed according to a page programming algorithm (e.g., that causes one or more voltage pulses or pulses to memory cells of a block based on the memory).

Overall, the process of writing data to NAND-type memory devices can involve several steps, which can include buffering data to be written, encoding the data (e.g., for error correction), and transferring resulting encoded data to the memory device (e.g., one or more memory cells of the NAND-type memory device). Due to the architecture of NAND-type memory devices, memory operations are typically performed on a page-by-page basis within a block. Blocks of a NAND-type memory device are generally not permitted to be left open (e.g., partially written to) for an extended period of time, as this can affect data integrity and lower the NAND-type memory device's lifespan. As such, when data is written to a block of a NAND-type memory device, data is typically written sequentially, and data is typically written to all pages of the block, thereby ensuring data integrity is maintained and increasing the NAND-type memory device's lifespan.

There are certain scenarios where it may be necessary to write padding data to an individual block (also known as padding the individual block with padding data) of a NAND-type memory device. For example, where there is not enough space to write required data to an individual block of a memory device of a memory system, the memory system can pad one or more pages of the individual block with padding data. This can ensure that the individual block is fully written and can be properly managed by a memory controller of the memory system. In another scenario, a memory system can pad one or more pages of an individual block with padding data to ensure pages align to a logical boundary. In this way, the padding data can ensure there are no "page holes" within the logical boundary. In another scenario, a memory system can pad one or more pages of an individual block with padding data in response to an error during a write process, such as a page or block program failure, when the individual block needs to be closed (e.g., once all pages within a block are programmed, it is considered closed). In yet another scenario, a memory system can pad one or more pages of an individual block with padding data to avoid wordline skewing between primary and secondary copies of data when a dual write fails with respect to one of the wordlines. As used herein, padding data can comprise random data, filler data, pattern data, garbage data, "don't care" data, or other non-meaningful data.

Conventional methods for writing padding data are similar to methods for performing other internal writes. In particular, conventional methods for writing padding data comprises filling a buffer with padding data, encoding the padding data from the buffer (e.g., encoded using a Low-Density Parity-Check (LDPC) encoding process), transferring the encoded padding data to a latch of a NAND-type memory device, and programming one or more pages of the NAND-type memory device with the encoded padding data from the latch. Unfortunately, this can be a waste of time and power for a memory system or a memory device given that padding data is typically don't care data (e.g., with metadata of a codeword/translation unit indicating that the codeword comprises padding data) that is written to multiple different blocks on a regular basis. The time and power wasted by conventional methods for writing padding data can be particularly detrimental during time-critical events, such as asynchronous power loss (APL) when a memory system (e.g., firmware thereof) tries to avoid writing padding data to save time and power. Even when different blocks are padded on a regular basis, conventional methodologies involve encoding and transferring the padding data to the latches to perform a padding operation on those different blocks.

Various embodiments presented herein can cure these and other deficiencies of conventional methodologies for writing padding data (also referred to as padding) one or more blocks. In particular, various embodiments presented herein provide for writing padding data to a memory device (e.g., NAND-type memory device) using an on-memory-device (e.g., on-NAND-chip) copy operation, which can be used as part of a memory system (e.g., memory sub-system). According to some embodiments, writing padding data to one or more target blocks of a memory device comprises performing an on-memory-device copy operation to copy padding data (e.g., one or more pages of padding data) from a padding source (e.g., dedicated padding source block) on the memory device to the one or more target blocks (e.g., to one or more target pages of the one or more target blocks).

For example, an embodiment can use a reserved padding data source block that is already storing (e.g., holding) padding data (e.g., a padding data pattern) to provide padding data for a padding operation. Instead of generating/creating new padding data each time the padding operation is performed (which consumes time and energy), an embodiment can perform an on-memory-device copy of some portion of the padding data from the reserved padding data source block (on the memory device) directly to one or more physical memory locations on the memory device where the padding data is to be written (e.g., where padding is applied). This approach can be much faster and more efficient (saving time and power) than a conventional method for writing padding data to one or more memory locations on a memory device.

For some embodiments, during an initial operation (e.g., at time 0), a first (and one) time initialization process can be performed, where a padding data source comprises one or more blocks (e.g., single SLC block) or one or more block stripes (e.g., each block stripe comprising a plurality of pages at position N across a plurality of blocks) is allocated (e.g., reserved) on a memory device for storing padding data, and the padding data is written to the padding data source (e.g., the padding data source is programmed with the padding data). Thereafter, for some embodiment, a padding operation is performed on a set of target blocks (e.g., that needs to be padded with padding data), where the padding operation performs an on-memory-device copy of at least a portion of padding data from the padding data source to the set of target blocks. For some embodiments, the on-memory-device copy of at least a portion of padding data from the padding data source to the set of target blocks comprises transferring (e.g., reading) one or more specific pages of padding data from the padding data source to a set of latches of the memory device, and programming (e.g., writing) a set of target pages in each target block with the one or more specific pages being stored (e.g., held by) the set of latches, where the one or more specific pages correspond to the set of target pages. For example, the on-memory-device copy operation can copy a page of the padding source data from a padding data source SLC block of wordline N to: a page of a target SLC block corresponding to wordline N; two pages of a target MLC block corresponding to wordline N; three pages of a target TLC block corresponding to wordline N; four pages of a target QLC block corresponding to wordline N, and five pages of a target PLC block corresponding to wordline N. Additionally, for some embodiments, where a target page of a target block has a seeding, a padding data page of the padding data (corresponding to the target page) used for the on-memory-device copy has the same seeding. According to some embodiments, a padding operation described herein can be performed in parallel for multiple blocks across multiple planes of a memory device, or for multiple blocks across multiple LUNs. A padding data source can comprise one or more blocks (e.g., a single dedicated block on each plane of a memory device) or a plurality (e.g., collection) of padding data pages across different blocks (e.g., a padding data source for a given plane of the memory device can comprise a plurality of pages across different blocks of the given plane). Additionally, the padding data source can be initialized and can be maintained by a memory system controller, such as a memory sub-system controller.

By writing padding data using an on-memory-device copy operation, various embodiments can avoid encoding padding data (e.g., by a memory system controller, such as a memory sub-system controller), and can avoid transferring padding data (e.g., encoded) from the memory system controller to a memory device to facilitate writing of the padding data to one or more blocks of the memory device. Avoiding the encoding and transferring of padding data can enable a memory system of some embodiments to save time, power, or both, especially during critical events such as asynchronous power loss (APL). Additionally, avoiding the encoding and transferring of padding data can enable a memory system to reduce or avoid use of one or more of the following: active memory used by a memory system controller; one or more encoding processes (e.g., LDPC encoding process); data access mechanisms (e.g., direct memory access (DMA)); data busses (e.g., Open NAND Flash Interface (OFNI) bus); and one or more resources of a memory system controller (e.g., registers, etc.). Overall, use of the on-memory-device copy to perform a padding operation can permit a memory system controller to offload the steps of copying data to a memory device of the memory system.

As used herein, padding data can comprise random data, filler data, pattern data (e.g., generated by a data pattern process), garbage data, "don't care" data, or other non-meaningful data. As used herein, writing padding data to one or more blocks can also be referred to as padding (or performing a padding operation on) the one or more blocks (with padding data). A padding operation can comprise writing padding data (e.g., one or more pages of padding data from a padding data source comprising one or more SLC blocks) to a target block that is a SLC block, and can be referred to as the padding operation can be referred to as SLC block padding. A padding operation can comprise writing padding data (e.g., one or more pages of padding data from a padding data source comprising one or more SLC blocks) to a target block that is an MLC block, and can be referred to as the padding operation can be referred to as MLC block padding. A padding operation can comprise writing padding data (e.g., one or more pages of padding data from a padding data source comprising one or more SLC blocks) to a target block that is a TLC block, and can be referred to as the padding operation can be referred to as TLC block padding. A padding operation can comprise writing padding data (e.g., one or more pages of padding data from a padding data source comprising one or more SLC blocks) to a target block that is a QLC block, and can be referred to as the padding operation can be referred to as QLC block padding. A padding operation can comprise writing padding data (e.g., one or more pages of padding data from a padding data source comprising one or more SLC blocks) to a target block that is a PLC block, and can be referred to as the padding operation can be referred to as PLC block padding.

As used herein, a padding data source can comprise one or more physical memory locations on a memory device allocated or otherwise dedicated to storing padding data that can be used to write padding data to one or more target physical memory locations on the memory device. For some embodiments, the padding data source comprises one or more blocks (e.g., padding source blocks) on the memory device, where each block comprises multiple pages, and where the one or more blocks can be initialized with padding data by a customer of the memory device or a manufacturer of the memory device (e.g., prior to shipping the memory device to a customer). Initialization of one or more blocks (e.g., padding data source blocks) with padding data can comprise allocating (e.g., reserving and designating) the one or more blocks for the padding data, generating the padding data (e.g., with a data pattern generator), and writing the padding data to the one or more blocks (e.g., programming the one or more blocks with the padding data). In this way, one or more blocks of a padding data source can be pre-defined with padding data. The one or more physical memory locations (e.g., one or more blocks) of a padding data source can be dedicated to storing and providing padding data for use during a padding operation. The one or more target physical memory locations on the memory device can comprise one or more blocks (e.g., target blocks) on the memory device.

Disclosed herein are some examples of writing padding data to a memory device (e.g., NAND-type memory device) using an on-memory-device (e.g., on-NAND-chip) copy operation, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes an on-device-copy-based padding data writer 113 that enables or facilitates the memory sub-system controller 115 to write padding data to a memory device (e.g., 130, 140) of the memory sub-system 110 using an on-memory-device (e.g., on-NAND-chip) copy operation as described herein. Some or all of the on-device-copy-based padding data writer 113 is included by the local media controller 135 to write padding data to a memory device (e.g., 130, 140) of the memory sub-system 110 using an on-memory-device copy operation as described herein.

Figure 2:
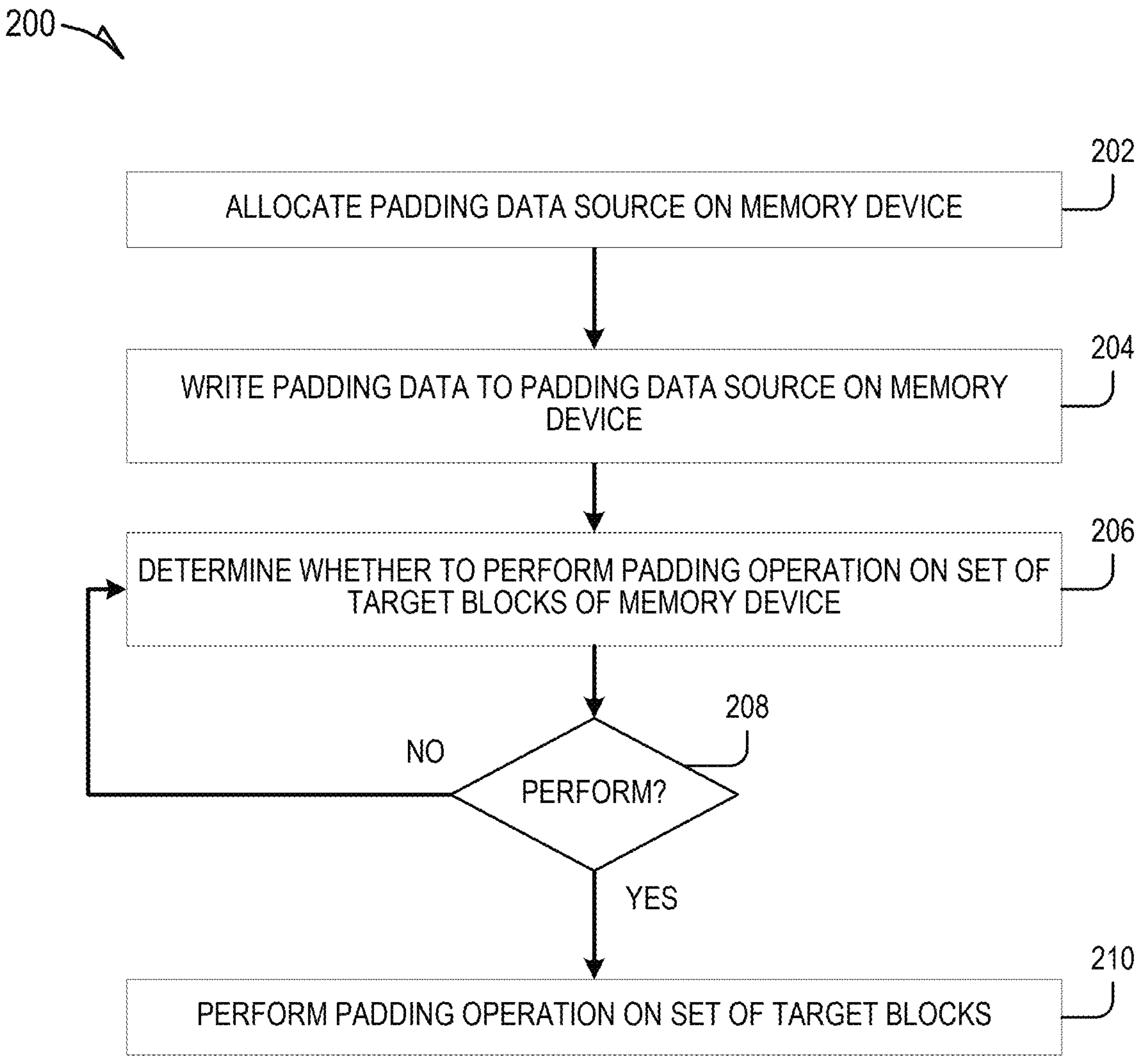
FIG. 2 illustrates a flow diagram of an example method for writing padding data to a memory device using an on-memory-device copy operation, in accordance with some embodiments of the present disclosure.

FIG. 2 illustrates a flow diagram of an example method 200 for writing padding data to a memory device using an on-memory-device copy operation, in accordance with some embodiments of the present disclosure. Any of method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 is performed by the memory sub-system controller 115 of FIG. 1 based on the on-device-copy-based padding data writer 113. Additionally, or alternatively, for some embodiments, method 200 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to method 200 of FIG. 2, at operation 202, a processing device (e.g., the processor 117 of a memory sub-system controller 115) allocates (e.g., reserves, designates) or causes allocation of a padding data source on a memory device (e.g., 130, 140). For various embodiments, the padding data source comprises one or more physical memory locations on the memory device. For instance, the padding data source can comprise a set of blocks (e.g., allocated, reserved, or dedicated blocks) of the memory device, where each block comprises a plurality of pages. In another instance, the padding data source can comprise one or more block stripes of the memory device, where each block stripe comprises a plurality of pages at position N across a plurality of blocks (e.g., each block being on a different plane of the memory device). For some embodiments, the padding data source comprises a set of single-level cell (SLC) blocks of the memory device. Additionally, for some embodiments, the memory device comprises a plurality of planes, where each plane of the plurality of planes comprises a different sub-plurality of the plurality of blocks of the memory device, and where the padding data source comprises a different padding data source (e.g., a single block) on each plane of the plurality of planes. In this way, each individual plane of the memory device comprises its own padding data source, which provides padding data for any padding operation performed on one or more target blocks on the individual plane (using an on-memory-device copy).

During operation 204, the processing device (e.g., the processor 117) writes padding data to the padding data source (allocated by operation 202) on the memory device (e.g., 130, 140). By operations 202, 204, a memory system (e.g., the memory sub-system 110) can initialize the padding data source on the memory device. Depending on the embodiment, operations 202, 204 can be performed by the memory system after the memory system has been received by a customer, or can be performed by the memory system prior to the memory system being sent to a customer (e.g., performed by a manufacturer of the memory system). Depending on the embodiment, the padding data can comprise random data, filler data, pattern data (e.g., generated by a data pattern process), garbage data, “don’t care” data, or other non-meaningful data. The padding data can be written to multiple pages of the padding data source.

At operation 206, the processing device (e.g., the processor 117) determines whether to perform a padding operation on a set of target blocks of a plurality of blocks of the memory device (e.g., 130, 140). For some embodiments, operation 206 comprises determining whether the set of target blocks satisfy a padding operation condition. The padding operation condition can relate to whether the set of target blocks lacks sufficient storage space to receive data, pages of the set of target blocks aligning with a logical boundary, programming of the set of target blocks, or wordline skewing. For instance, the padding operation condition can be satisfied when the set of target blocks lacks sufficient storage space for data to be written the set of target blocks. The padding operation condition can be satisfied when pages of the set of target blocks fail to align with a logical boundary. The padding operation condition can be satisfied when programming of the set of target blocks fails. The padding operation condition can be satisfied when preventing wordline skewing with respect to the set of target blocks.

At operation 208, in response to the processing device determining that the padding operation on the set of target blocks is to be performed, method 200 proceeds to operation 210. At operation 208, in response to the processing device determining that the padding operation on the set of target blocks is not to be performed, method 200 can return to operation 206, where the processing device can redetermine whether to perform a padding operation on the set of target blocks.

During operation 210, the processing device (e.g., the processor 117) performs the padding operation on the set of target blocks, where the padding operation comprises performing an on-memory-device copy operation to copy at least a portion (e.g., one or more padding data pages) of the padding data from the padding data source on the memory device to the set of target blocks. For some embodiments, performing the on-memory-device copy operation (to copy the at least portion of the padding data from the padding data source on the memory device to the set of target blocks) comprises transferring (e.g., reading) the at least portion of the padding data from the padding data source to a set of latches of the memory device, and programming the set of target blocks with the at least portion of the padding data from the set of latches, thereby writing the at least portion of the padding data to the set of target blocks. For some embodiments, the set of target blocks comprises an individual target block comprising a set of target pages, the at least portion of the padding data comprises an individual padding data source block comprising a set of padding data pages, and locations (e.g., wordlines) of the set of padding data pages in the individual padding data source block correspond to (e.g., line up with) locations (e.g., wordlines) of the set of target pages in the individual target block. For instance, during operation 210, padding data from a padding data page of wordline N from the padding data source can be written to one or more target pages of wordline N of an individual target block. Additionally, for some embodiments, where a target page of a target block has a seeding, a padding data page of the padding data (corresponding to the target page) used for the on-memory-device copy has the same seeding.

For some embodiments, where the set of target blocks comprises a target block on a select plane of the memory device and where the padding data source comprises a padding data source block (e.g., SLC block) on the select plane, performing the on-memory-device copy operation (to copy the at least portion of the padding data from the padding data source on the memory device to the set of target blocks) comprises transferring a set of padding data pages of the padding data from the padding data source block to a set of latches of the memory device, and programming a set of target pages of the target block with the set of padding data pages from the set of latches, where the set of latches corresponds to (e.g., dedicated for use with) the select plane. Alternatively, for some embodiments, where the set of target blocks comprises a plurality of target blocks on a select plane of the memory device and where the padding data source comprises a single padding data source block (e.g., single SLC block) on the select plane, performing the on-memory-device copy operation (to copy the at least portion of the padding data from the padding data source on the memory device to the set of target blocks) comprises transferring a set of padding data pages of the padding data from the padding data source block to a set of latches of the memory device (where the set of latches corresponds to the select plane), and programming a set of target pages of each target block of the plurality of target blocks with the set of padding data pages from the set of latches. In this way, various embodiments can copy data from one block in a plane to many block on the same select plane in parallel (e.g., copying the at least portion of padding data from one or more pages of a single padding data source block on a select plane to pages of multiple target blocks on the select plane). Further, for some embodiments, the padding data source comprises a set of single-level cell (SLC) blocks, and each block of the set of target blocks is at least one of a multi-level cell (MLC) block, a triple-level cell (TLC) block, or a quad-level cell (QLC) block. In this way, one or more padding data pages from the set of SLC blocks can be copied on the memory device to one or more pages of the target non-SLC blocks (according to corresponding wordlines), such as target MLC blocks, target TLC blocks, or target QLC blocks.

According to some embodiments, padding operations can be performed in parallel for multiple planes of the memory device. For example, assume the set of target blocks comprises a first target block on a first plane of the memory device and a second target block on a second plane of the memory device, and the padding data source comprises a first padding data source block on the first plane and a second padding data source block on the second plane. Performing the on-memory-device copy operation to copy the at least portion of the padding data (from the padding data source on the memory device to the set of target blocks) can comprise performing a first on-memory-device copy operation in parallel with a second on-memory-device copy operation. The first on-memory-device copy operation can comprise transferring a first set of padding data pages of the padding data from the first padding data source block to a first set of latches of the memory device, and programming a first set of target pages of the first target block with the first set of padding data pages from the first set of latches, where the first set of latches corresponds to the first plane. The second on-memory-device copy operation can comprise transferring a second set of padding data pages of the padding data from the second padding data source block to a second set of latches of the memory device, and programming a second set of target pages of the second target block with the second set of padding data pages from the second set of latches, where the second set of latches corresponds to the second plane.

The transfer of the at least portion of the padding data from the padding data source to the set of latches of the memory device can comprise activating one or more wordlines corresponding to the at least portion of the padding data (e.g., wordlines corresponding to memory cells of one or more padding data pages of the padding data being read), and sensing voltage levels on one or more bitlines coupled to those one or more wordlines (e.g., using one or more sense amplifiers of the memory device connected to the one or more bitlines). Activation of the one or more wordlines can be performed by applying an appropriate read voltage level (read level) to those one or more wordlines, where the read voltage level causes the memory cells along the activated word line to conduct or block current, depending on their programmed state (charged or discharged). For some embodiments, the one or more sense amplifiers are part of sense amplifier circuitry of the memory device, and the set of latches form part of that sense amplifier circuitry. For some embodiments, the set of latches is configured to hold (e.g., store) the voltage levels sensed from the one or more bitlines, where the held voltage levels represent the at least portion of the padding data read from the padding data source. While the held voltage levels can be interpreted (e.g., by the memory sub-system controller 115) into a string of binary values that form the at least portion of the padding data, various embodiments can avoid interpreting (e.g., decoding) the held voltage levels and, rather, program the set of target blocks using the held voltage levels (e.g., apply those held voltage levels to the set of target blocks as-is). For some embodiments, the transfer of the at least portion of the padding data from the padding data source to the set of latches of the memory device comprises transferring (e.g., sensing voltage levels) in parallel from an individual block on each of multiple planes of the memory device to the multiple sets of latches of the memory device (a different set of latches associated with each individual plane).

Figure 3A:
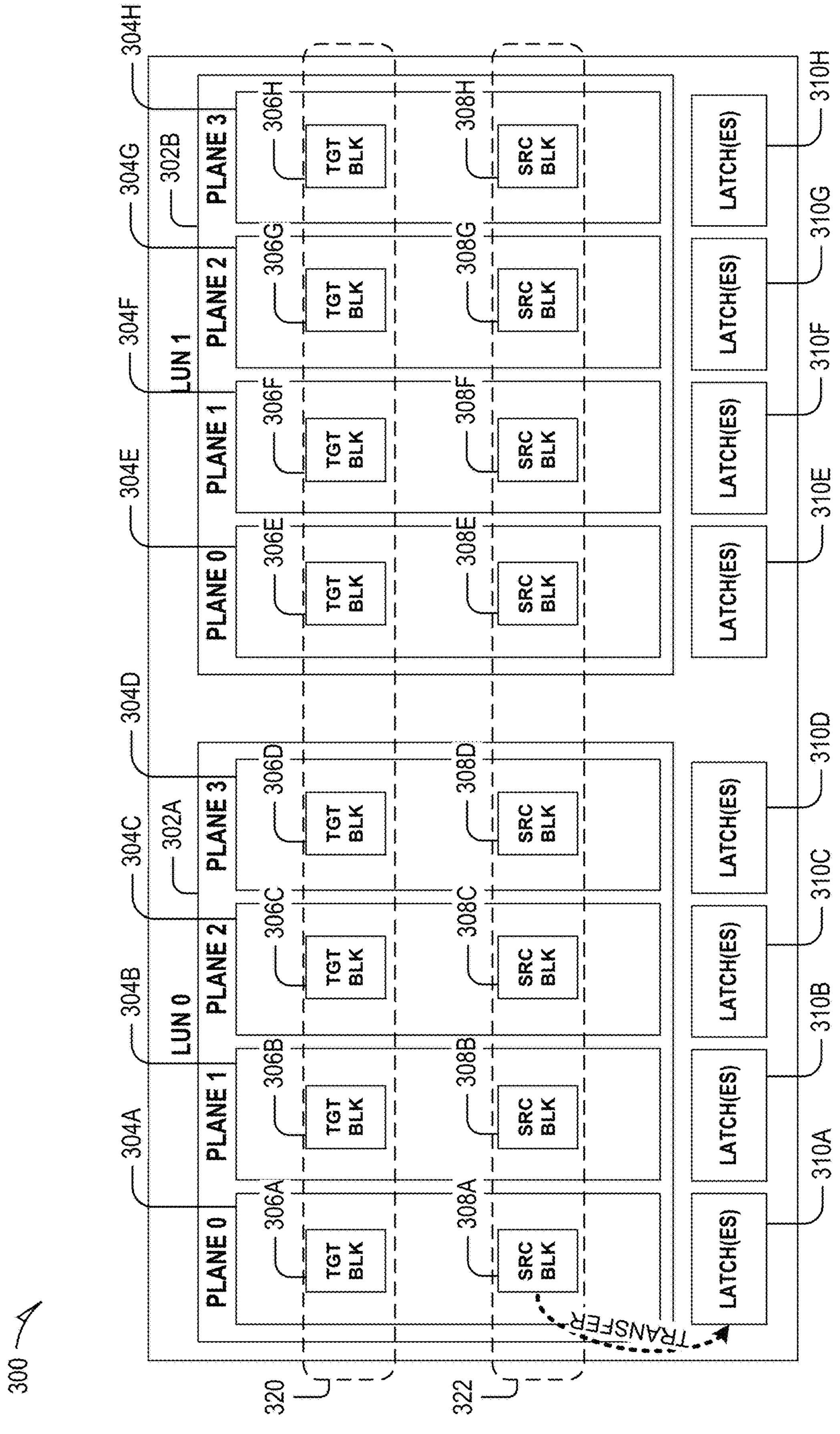
FIGS. 3A and 3B are block diagrams illustrating an example of writing padding data on a memory device using an on-memory-device copy operation, in accordance with some embodiments of the present disclosure.
Figure 3B:
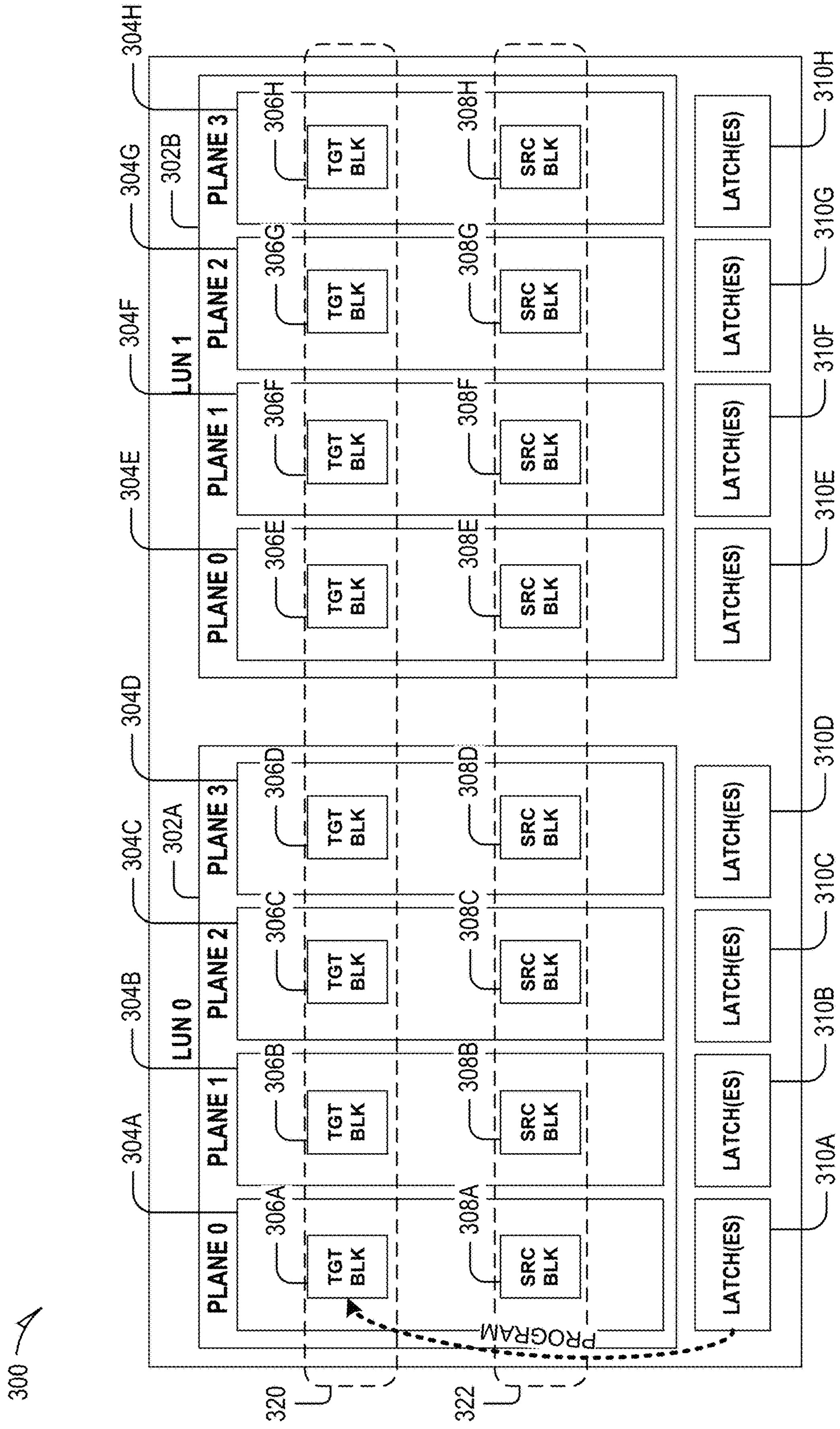

FIGS. 3A and 3B are block diagrams illustrating an example of writing padding data on a memory device 300 using an on-memory-device copy operation, in accordance with some embodiments of the present disclosure. The memory device 300 can be part of a memory system, such as the memory sub-system 110. As shown, the memory device 300 comprises logical units (LUNs) 302A, 302B, with LUN 302A comprising (e.g., grouping together) planes 304A, 304B, 304C, 304D, and with LUN 302B comprising (e.g., grouping together) planes 304E, 304F, 304G, 304H. Each plane can represent a different plane of a circuit die (or die) of a NAND-type memory device. Each individual plane (of planes 304A through 304H) of the memory device 300 comprises its own padding data source block 308 that stores and provides padding data for a padding operation performed on any target block of the individual plane. Additionally, each individual plane (of planes 304A through 304H) of the memory device 300 has a corresponding set of latches, which can be exclusively used for reading data from (e.g., sensing voltage levels from memory cells of) one or more blocks of the individual plane, such as the padding data source block 308 of the individual plane. In FIGS. 3A and 3B, plane 304A has a padding source block 308A and a set of latches 310A, plane 304B has a padding source block 308B and a set of latches 310B, plane 304C has a padding source block 308C and a set of latches 310C, plane 304D has a padding source block 308D and a set of latches 310D, plane 304E has a padding source block 308E and a set of latches 310E, plane 304F has a padding source block 308F and a set of latches 310F, plane 304G has a padding source block 308G and a set of latches 310G, and plane 304H has a padding source block 308H and a set of latches 310H. For some embodiments, each latch stores data of an individual page of a block.

Upon determining that padding data is to be written to one or more target pages of target block 306A on plane 304A, one or more padding data pages are transferred from padding data source block 308A to one or more latches of the set of latches 310A (e.g., the one or more padding data pages are sensed in parallel by the one or more latches), where the one or more padding data pages correspond to the one or more target pages (e.g., correspond according to wordlines). Once the one or more padding data pages are held by the one or more latches of the set of latches latch 310A, as shown in FIG. 3B, the one or more target pages of target block 306A can be programmed with the one or more padding data pages held by the one or more latches. The transferring of the one or more padding data pages from padding data source block 308A and subsequent programming of the one or more target pages of target block 306A represents an on-memory-device copy of the one or more padding data pages from source block 308A to target block 306A. Though not illustrated, such on-memory-device copying, of one or more padding data pages from a padding data source block to one or more target pages of a target block, can be performed on two or more of planes 304A through 304H in parallel using those planes' respective sets of latches. For instance, such parallel operations across multiple planes of planes 304A through 304H can be performed in parallel with respect to pages of two or more padding data source blocks 308A, 308B, 308C, 308D, 308E, 308F, 308G, 308H of block stripe 322, and pages of two or more target blocks 306A, 306B, 306C, 306D, 306E, 306F, 306G, 306H of block stripe 320.

Figure 4:
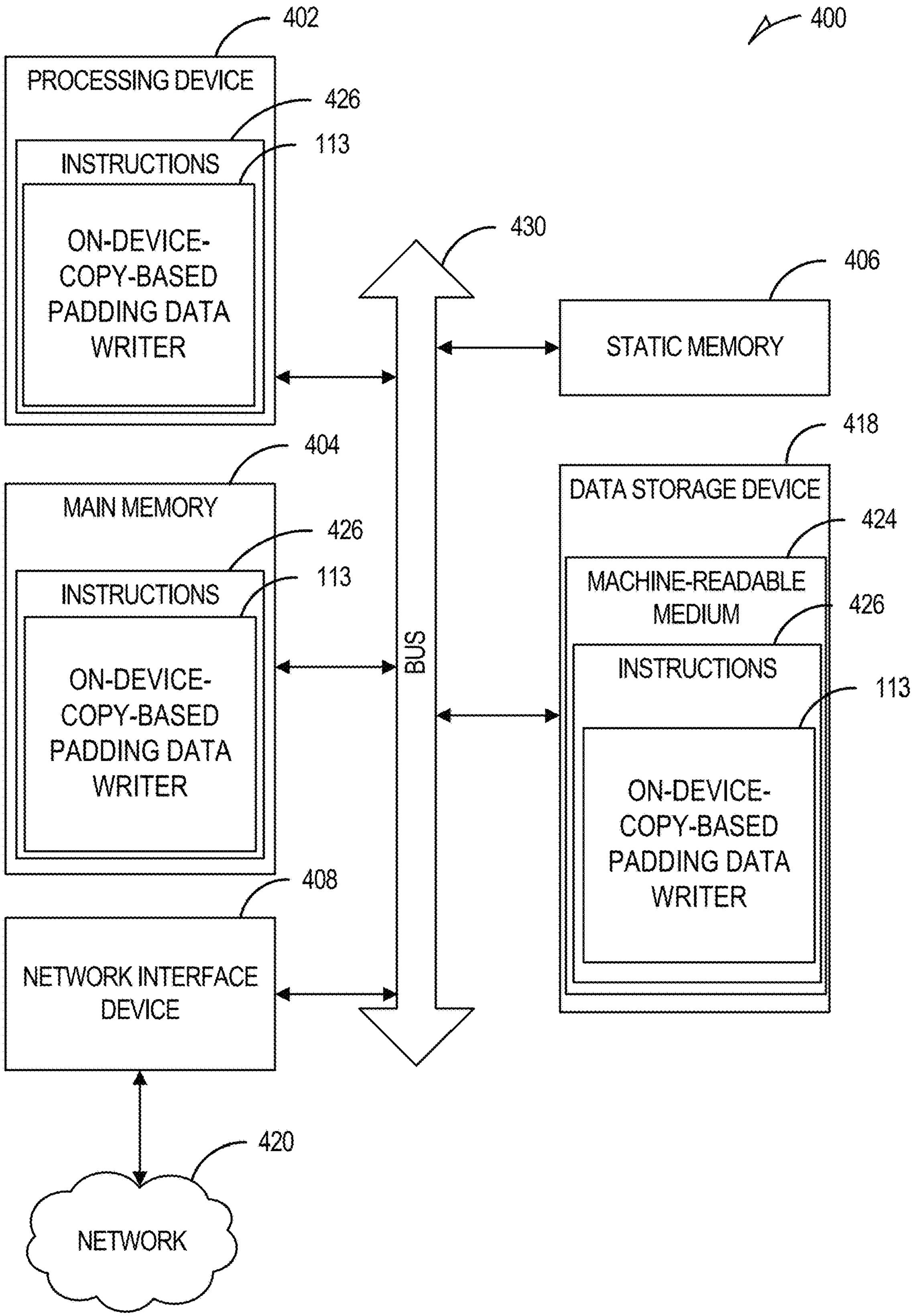
FIG. 4 is a block diagram of an example computer system in which embodiments of the present disclosure may operate.

FIG. 4 illustrates an example machine in the form of a computer system 400 within which a set of instructions can be executed for causing the machine to perform any one or more of the methodologies discussed herein. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or Rambus DRAM (RDRAM), etc.), a static memory 406 (e.g., flash memory, static random access memory (SRAM), etc.), and a data storage device 418, which communicate with each other via a bus 430.

The processing device 402 represents one or more general-purpose processing devices such as a microprocessor, a central processing unit, or the like. More particularly, the processing device 402 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 can also be one or more special-purpose processing devices such as an application-specific integrated circuit (ASIC), a field programmable gate array (FPGA), a digital signal processor (DSP), a network processor, or the like. The processing device 402 is configured to execute instructions 426 for performing the operations and steps discussed herein. The computer system 400 can further include a network interface device 408 to communicate over a network 420.

The data storage device 418 can include a machine-readable storage medium 424 (also known as a computer-readable medium) on which is stored one or more sets of instructions 426 or software embodying any one or more of the methodologies or functions described herein. For some embodiments, the machine-readable storage medium 424 is a non-transitory machine-readable storage medium. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage device 418, and/or main memory 404 can correspond to the memory sub-system 110 of FIG. 1.

In one embodiment, the instructions 426 include instructions to implement functionality corresponding to write padding data to a memory device using an on-memory-device copy operation as described herein (e.g., the on-device-copy-based padding data writer 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory device comprising a plurality of blocks, each block of the plurality of blocks comprising a plurality of pages; and a processing device, operatively coupled to the memory device, configured to perform operations comprising: writing padding data to a padding data source on the memory device; determining whether to perform a padding operation on a set of target blocks of the plurality of blocks; and performing the padding operation on the set of target blocks in response to determining that the padding operation is to be performed on the set of target blocks, the performing of the padding operation on the set of target blocks comprising performing an on-memory-device copy operation to copy at least a portion of the padding data from the padding data source on the memory device to the set of target blocks.

In Example 2, the subject matter of Example 1 includes, wherein the performing of the on-memory-device copy operation to copy the at least portion of the padding data from the padding data source on the memory device to the set of target blocks comprises: transferring the at least portion of the padding data from the padding data source to a set of latches of the memory device; and programming the set of target blocks with the at least portion of the padding data from the set of latches.

In Example 3, the subject matter of Examples 1-2 includes, wherein the set of target blocks comprises an individual target block comprising a set of target pages, wherein the at least portion of the padding data comprises an individual padding data source block comprising a set of padding data pages, and wherein locations of the set of padding data pages in the individual padding data source block correspond to locations of the set of target pages in the individual target block.

In Example 4, the subject matter of Examples 1-3 includes, wherein the padding data source comprises one or more block stripes.

In Example 5, the subject matter of Examples 1-4 includes, wherein the padding data source comprises a set of single-level cell (SLC) blocks, and wherein each block of the set of target blocks is at least one of a multi-level cell (MLC) block, a triple-level cell (TLC) block, or a quad-level cell (QLC) block.

In Example 6, the subject matter of Examples 1-5 includes, wherein the set of target blocks comprises a target block on a select plane of the memory device, wherein the padding data source comprises a padding data source block on the select plane, and wherein the performing of the on-memory-device copy operation to copy the at least portion of the padding data from the padding data source on the memory device to the set of target blocks comprises: transferring a set of padding data pages of the padding data from the padding data source block to a set of latches of the memory device, the set of latches corresponding to the select plane; and programming a set of target pages of the target block with the set of padding data pages from the set of latches.

In Example 7, the subject matter of Examples 1-6 includes, wherein the set of target blocks comprises a plurality of target blocks on a select plane of the memory device, wherein the padding data source comprises a single padding data source block on the select plane, and wherein the performing of the on-memory-device copy operation to copy the at least portion of the padding data from the padding data source on the memory device to the set of target blocks comprises: transferring a set of padding data pages of the padding data from the padding data source block to a set of latches of the memory device, the set of latches corresponding to the select plane; and programming a set of target pages of each target block of the plurality of target blocks with the set of padding data pages from the set of latches.

In Example 8, the subject matter of Examples 1-7 includes, wherein the set of target blocks comprises a first target block on a first plane of the memory device and a second target block on a second plane of the memory device; wherein the padding data source comprises a first padding data source block on the first plane and a second padding data source block on the second plane; wherein the performing of the on-memory-device copy operation to copy the at least portion of the padding data from the padding data source on the memory device to the set of target blocks comprises performing a first on-memory-device copy operation in parallel with a second on-memory-device copy operation; wherein the first on-memory-device copy operation comprises: transferring a first set of padding data pages of the padding data from the first padding data source block to a first set of latches of the memory device, the first set of latches corresponding to the first plane; and programming a first set of target pages of the first target block with the first set of padding data pages from the first set of latches; and wherein the second on-memory-device copy operation comprises: transferring a second set of padding data pages of the padding data from the second padding data source block to a second set of latches of the memory device, the second set of latches corresponding to the second plane; and programming a second set of target pages of the second target block with the second set of padding data pages from the second set of latches.

In Example 9, the subject matter of Examples 1-8 includes, wherein the operations comprise: prior to the writing of the padding data to the padding data source on the memory device, allocating the padding data source on the memory device.

In Example 10, the subject matter of Examples 1-9 includes, wherein the memory device comprises a plurality of planes, wherein each plane of the plurality of planes comprises a different sub-plurality of the plurality of blocks, and wherein the padding data source comprises a different padding data source on each plane of the plurality of planes.

In Example 11, the subject matter of Example 10 includes, wherein the different padding data source on each plane comprises a single block on the plane.

In Example 12, the subject matter of Examples 1-11 includes, wherein the determining of whether to perform the padding operation on the set of target blocks of the plurality of blocks comprises: determining whether the set of target blocks satisfy a padding operation condition, the padding operation condition being satisfied when the set of target blocks lacks sufficient storage space for data to be written the set of target blocks.

In Example 13, the subject matter of Examples 1-12 includes, wherein the determining of whether to perform the padding operation on the set of target blocks of the plurality of blocks comprises: determining whether the set of target blocks satisfy a padding operation condition, the padding operation condition being satisfied when pages of the set of target blocks fail to align with a logical boundary.

In Example 14, the subject matter of Examples 1-13 includes, wherein the determining of whether to perform the padding operation on the set of target blocks of the plurality of blocks comprises: determining whether the set of target blocks satisfy a padding operation condition, the padding operation condition being satisfied when programming of the set of target blocks fails.

In Example 15, the subject matter of Examples 1-14 includes, wherein the determining of whether to perform the padding operation on the set of target blocks of the plurality of blocks comprises: determining whether the set of target blocks satisfy a padding operation condition, the padding operation condition being satisfied when preventing word-line skewing with respect to the set of target blocks.

Example 16 is at least one machine-readable medium including instructions that, when executed by a processing device of a memory sub-system, cause the processing device to perform operations to implement of any of Examples 1-15.

Example 17 is a method to implement of any of Examples 1-15.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device comprising a plurality of blocks, each block of the plurality of blocks comprising a plurality of pages; and a processing device, operatively coupled to the memory device, configured to perform operations comprising:

writing padding data to a padding data source on the memory device;

determining whether to perform a padding operation on a set of target blocks of the plurality of blocks; and performing the padding operation on the set of target blocks in response to determining that the padding operation is to be performed on the set of target blocks, the performing of the padding operation on the set of target blocks comprising performing an on-memory-device copy operation to copy at least a portion of the padding data from the padding data source on the memory device to the set of target blocks.

2. The system of claim 1, wherein the performing of the on-memory-device copy operation to copy the at least portion of the padding data from the padding data source on the memory device to the set of target blocks comprises:

transferring the at least portion of the padding data from the padding data source to a set of latches of the memory device; and programming the set of target blocks with the at least portion of the padding data from the set of latches.

3. The system of claim 1, wherein the set of target blocks comprises an individual target block comprising a set of target pages, wherein the at least portion of the padding data comprises an individual padding data source block comprising a set of padding data pages, and wherein locations of the set of padding data pages in the individual padding data source block correspond to locations of the set of target pages in the individual target block.

4. The system of claim 1, wherein the padding data source comprises one or more block stripes.

5. The system of claim 1, wherein the padding data source comprises a set of single-level cell (SLC) blocks, and wherein each block of the set of target blocks is at least one of a multi-level cell (MLC) block, a triple-level cell (TLC) block, or a quad-level cell (QLC) block.

6. The system of claim 1, wherein the set of target blocks comprises a target block on a select plane of the memory device, wherein the padding data source comprises a padding data source block on the select plane, and wherein the performing of the on-memory-device copy operation to copy the at least portion of the padding data from the padding data source on the memory device to the set of target blocks comprises:

transferring a set of padding data pages of the padding data from the padding data source block to a set of latches of the memory device, the set of latches corresponding to the select plane; and programming a set of target pages of the target block with the set of padding data pages from the set of latches.

7. The system of claim 1, wherein the set of target blocks comprises a plurality of target blocks on a select plane of the memory device, wherein the padding data source comprises a single padding data source block on the select plane, and wherein the performing of the on-memory-device copy operation to copy the at least portion of the padding data from the padding data source on the memory device to the set of target blocks comprises:

transferring a set of padding data pages of the padding data from the padding data source block to a set of latches of the memory device, the set of latches corresponding to the select plane; and programming a set of target pages of each target block of the plurality of target blocks with the set of padding data pages from the set of latches.

8. The system of claim 1, wherein the set of target blocks comprises a first target block on a first plane of the memory device and a second target block on a second plane of the memory device; wherein the padding data source comprises a first padding data source block on the first plane and a second padding data source block on the second plane; wherein the performing of the on-memory-device copy operation to copy the at least portion of the padding data from the padding data source on the memory device to the set of target blocks comprises performing a first on-memory-device copy operation in parallel with a second on-memory-device copy operation;

wherein the first on-memory-device copy operation comprises:

transferring a first set of padding data pages of the padding data from the first padding data source block to a first set of latches of the memory device, the first set of latches corresponding to the first plane; and programming a first set of target pages of the first target block with the first set of padding data pages from the first set of latches; and wherein the second on-memory-device copy operation comprises:

transferring a second set of padding data pages of the padding data from the second padding data source block to a second set of latches of the memory device, the second set of latches corresponding to the second plane; and programming a second set of target pages of the second target block with the second set of padding data pages from the second set of latches.

9. The system of claim 1, wherein the operations comprise:

prior to the writing of the padding data to the padding data source on the memory device, allocating the padding data source on the memory device.

10. The system of claim 1, wherein the memory device comprises a plurality of planes, wherein each plane of the plurality of planes comprises a different sub-plurality of the plurality of blocks, and wherein the padding data source comprises a different padding data source on each plane of the plurality of planes.

11. The system of claim 10, wherein the different padding data source on each plane comprises a single block on the plane.

12. The system of claim 1, wherein the determining of whether to perform the padding operation on the set of target blocks of the plurality of blocks comprises:

determining whether the set of target blocks satisfy a padding operation condition, the padding operation condition being satisfied when the set of target blocks lacks sufficient storage space for data to be written to the set of target blocks.

13. The system of claim 1, wherein the determining of whether to perform the padding operation on the set of target blocks of the plurality of blocks comprises:

determining whether the set of target blocks satisfy a padding operation condition, the padding operation condition being satisfied when pages of the set of target blocks fail to align with a logical boundary.

14. The system of claim 1, wherein the determining of whether to perform the padding operation on the set of target blocks of the plurality of blocks comprises:

determining whether the set of target blocks satisfy a padding operation condition, the padding operation condition being satisfied when programming of the set of target blocks fails.

15. The system of claim 1, wherein the determining of whether to perform the padding operation on the set of target blocks of the plurality of blocks comprises:

determining whether the set of target blocks satisfy a padding operation condition, the padding operation condition being satisfied when preventing wordline skewing with respect to the set of target blocks.

16. At least one non-transitory machine-readable storage medium comprising instructions that, when executed by a processing device of a memory sub-system, cause the processing device to perform operations comprising:

writing padding data to a padding data source on a memory device of the memory sub-system, the memory device comprising a plurality of blocks, each block of the plurality of blocks comprising a plurality of pages;

determining whether to perform a padding operation on a set of target blocks of the plurality of blocks; and performing the padding operation on the set of target blocks in response to determining that the padding operation is to be performed on the set of target blocks, the performing of the padding operation on the set of target blocks comprising performing an on-memory-device copy operation to copy at least a portion of the padding data from the padding data source on the memory device to the set of target blocks.

17. The at least one non-transitory machine-readable storage medium of claim 16, wherein the performing of the on-memory-device copy operation to copy the at least portion of the padding data from the padding data source on the memory device to the set of target blocks comprises:

transferring the at least portion of the padding data from the padding data source to a set of latches of the memory device; and programming the set of target blocks with the at least portion of the padding data from the set of latches.

18. The at least one non-transitory machine-readable storage medium of claim 16, wherein the set of target blocks comprises an individual target block comprising a set of target pages, wherein the at least portion of the padding data comprises an individual padding data source block comprising a set of padding data pages, and wherein locations of the set of padding data pages in the individual padding data source block correspond to locations of the set of target pages in the individual target block.

19. The at least one non-transitory machine-readable storage medium of claim 16, wherein the padding data source comprises one or more block stripes.

20. A method comprising:

writing padding data to a padding data source on a memory device;

determining that a padding operation is to be performed on a set of target blocks of a plurality of blocks of the memory device, each block of the plurality of blocks comprising a plurality of pages; and performing the padding operation on the set of target blocks in response to determining that the padding operation is to be performed on the set of target blocks, the performing of the padding operation on the set of target blocks comprising performing an on-memory-device copy operation to copy at least a portion of the padding data from the padding data source on the memory device to the set of target blocks.

* * * * *